United States Patent
Rodriguez et al.

(10) Patent No.: US 10,124,737 B2
(45) Date of Patent: Nov. 13, 2018

(54) RETRACTABLE AND ADJUSTABLE HOOK ASSEMBLIES

(71) Applicant: Ford Global Technologies, LLC, Dearborn, MI (US)

(72) Inventors: Juan Rodriguez, Cuajimalpa de Morelos (MX); Enrique Granell Peniche, Naucalpan de Juarez (MX)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/014,066

(22) Filed: Feb. 3, 2016

(65) Prior Publication Data
US 2017/0217378 A1 Aug. 3, 2017

(51) Int. Cl.
B60R 7/10 (2006.01)
B60R 7/12 (2006.01)
B60R 11/00 (2006.01)
B60R 7/08 (2006.01)

(52) U.S. Cl.
CPC ............... *B60R 7/10* (2013.01); *B60R 7/08* (2013.01); *B60R 7/12* (2013.01); *B60R 11/00* (2013.01)

(58) Field of Classification Search
CPC .... B60R 7/10; B60R 7/12; B60R 7/14; B60R 11/00; B60R 7/08; B60R 2011/0003; B60R 2011/0028; B60R 2011/0059; B60R 2011/0071; B60R 2011/008; B60R 2011/0082; F03G 1/00; A41D 27/22; E04G 3/00; F16B 45/00; F16H 31/00

USPC ....... 224/313, 544; 248/307, 292.12, 292.13, 248/304, 322, 339, 340, 308; 74/141; 185/40 H, 45
See application file for complete search history.

(56) References Cited

U.S. PATENT DOCUMENTS

| | | | |
|---|---|---|---|
| 5,411,233 A | 5/1995 | Grimes, III et al. | |
| 5,765,736 A * | 6/1998 | Fischer | B60N 3/102 224/281 |
| 5,769,294 A | 6/1998 | Heinz et al. | |
| 6,422,524 B1 * | 7/2002 | Spagnuolo | B60R 7/10 248/307 |
| 7,669,821 B2 | 3/2010 | Martin | |
| 8,079,446 B2 * | 12/2011 | Nemoto | B60R 7/10 185/40 H |
| 8,136,780 B2 * | 3/2012 | Lin | F16M 11/28 248/316.4 |
| 8,356,777 B2 * | 1/2013 | Miles | F16L 3/133 248/292.12 |
| 2001/0046425 A1 | 11/2001 | Vagnino | |

FOREIGN PATENT DOCUMENTS

GB 2421485 A 6/2006

\* cited by examiner

*Primary Examiner* — Nkeisha Smith
(74) *Attorney, Agent, or Firm* — Vichit Chea; Brooks Kushman, P.C.

(57) ABSTRACT

A vehicle hook assembly may include a housing having an internal cavity receiving a slidable portion having a hook at a distal end thereof and a rail extending along a side of the slidable portion and at least one depressible knob configured to maintain the slidable portion at a fixed lateral positon relative to the housing in a relaxed state and to allow lateral movement of the slidable portion relative to the housing in a depressed state.

11 Claims, 8 Drawing Sheets

RETRACTABLE AND ADJUSTABLE HOOK ASSEMBLIES

TECHNICAL FIELD

Disclosed herein are vehicle hook assemblies.

BACKGROUND

Vehicle interiors are often equipped with various hooks and handles allowing for users to hang or attach various items thereto. Such hooks may be arranged within the vehicle, for example, on vehicle headliners, vehicles sides, etc.

SUMMARY

A vehicle hook assembly may include a housing having an internal cavity receiving a slidable portion having a hook at a distal end thereof and a rail extending along a side of the slidable portion and at least one depressible knob configured to maintain the slidable portion at a fixed lateral positon relative to the housing in a relaxed state and to allow lateral movement of the slidable portion relative to the housing in a depressed state.

A hook assembly may include a housing having an internal cavity and a at least one projection therein, the housing receiving a slidable portion having a hook at a distal end thereof, and a rail extending along a side of the slidable portion and including at least one depressible knob and a plurality of prongs along a spine, the prongs configured to engage with the projection to maintain the slidable portion at a fixed lateral position relative to the housing when the knob is in a relaxed state, the prongs further configured to disengage with the projection to allow lateral movement of the slidable portion when the knob is in a depressed state.

A vehicle hook assembly may include a housing having an internal cavity receiving a slidable portion for translating between a first and second position within the housing, the slidable portion having a distal end and a hook extending from the distal end.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a hook assembly for a vehicle that is both extendable and storable. Often, when users place plastics bags from the supermarket in a trunk of a vehicle, the bags move about the trunk during transit, leading to spills, damaged or broken items, and general user dissatisfaction. The hook assembly herein may be arranged within the vehicle trunk on a vehicle trunk plate. The hook assembly may be stored during non-use. When a user wishes to hang a bag or other item from the hook assembly, a hook may be pulled down from its stored position on the trunk plate. The length of the hook may also be adjusted to the user's desired length by depressing a knob and sliding the hook out of a housing to its desired length. The hook assembly may be installed on the vehicle trunk plate during manufacturing so as to avoid aftermarket installation. Furthermore, the hook assembly may be arranged on the underside of the trunk plate, so that the hook may extend down from the top of the trunk to easily receive a grocery bag or other item. Multiple hook assemblies may be arranged on the trunk plate. Additionally or alternatively, the hook assemblies may be arranged throughout the trunk and vehicle such as on a vehicle headliner, seat back, trunk side, etc.

Figure 1:
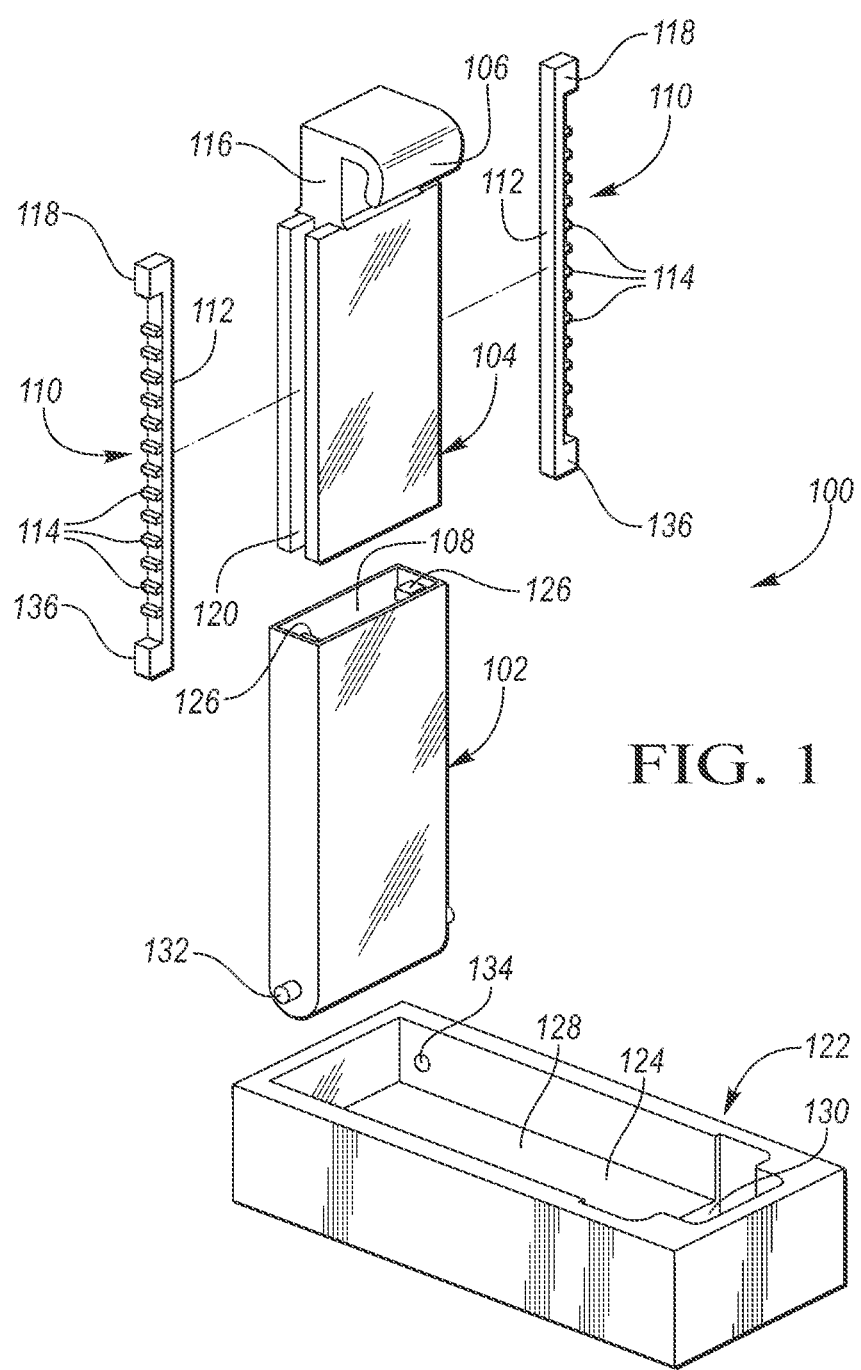
FIG. 1 is an exploded perspective view of a hook assembly.

FIG. 1 is an exploded perspective view of a hook assembly 100. The hook assembly 100 may include a housing 102 having an internal cavity 108 and at least one projection 126 arranged within the cavity 108. While the example shown in FIG. 1 includes a projection 126 arranged on each side of the housing 102, a single projection 126 on one side of the housing 102 may be possible.

The housing 102 may receive a slidable portion 104 within the cavity 108. A hook 106 may be arranged at a distal end 116 of the slidable portion 104 and may be configured to hold various items within the vehicle such as handles of grocery bags, clothes hangers, etc. The slidable portion 104 may be slidable within the housing 102 between a first position, or a retracted position, and a second position, or a fully elongated position. The slidable portion 104 may allow the length of the hook assembly 100 to be adjusted at any length between the first and second positions. In one example, the length may extend to approximately 16 centimeters in the fully elongate position.

The slidable portion 104 may define a groove 120 along the side or sides thereof. The groove 120 may be configured to receive a rail 110. The rail 110 may be pliable within the groove 120 in that the rail 110 may move inward and outward within the groove 120. The rail 110 may include a spine 112 and a plurality of rail prongs 114 (also referred to as prongs 114) extending along and outwardly from the spine 112. While the example shown in FIG. 1 includes a groove 120 and rail 110 at each side of the slidable portion 104, a single groove 120 and rail 110 on one side of the slidable portion 104 may be possible. The rail 110 may be maintained within the groove 120 via a pin assembly similar to that described below with respect to FIG. 6.

The rail 110 may include at least one knob 118. The knob 118 may be depressible and configured to move the rail 112 within the groove 120. Upon depressing the knob 118, or pulling the knob inward towards the slidable portion 104, the spine 112 and subsequently the prongs 114, may also move inward toward the slidable portion 104. Upon releasing the knob 118, the spine 112 may relax to a normal resting state away from the slidable portion 104.

At least one of the prongs 114 may be configured to engage with the projection 126 of the housing 102 in a relaxed state. When the prongs 114 engage on either or both sides of the projection 126, the slidable portion 104 may be laterally fixed within the housing 102. Upon depressing the knob 118, the prongs 114 may release the projection 126, allowing for lateral movement of the slidable portion 104 within the housing 102. In use, a user may depress the knob 118 and slide the slidable portion 104 within the housing 102 until a desired length of the hook is achieved. Upon achieving the desired length, the knob 118 may be released and the prongs 114 may engage the projection 126 so that the slidable portion 104 may be maintained at the fixed lateral position with respect to the housing 102. In the example shown in FIG. 1, where a pair of rails 110 are included along the sides of the slidable portion 104, the knobs 118 may be concurrently pinched inward towards the hook 106 to release the prongs 114 from the projections 126.

The rail 110 may also include a stop 136 arranged at an end opposite that of the knob 118. The stop 136 may be configured to abut the projection 126 within the housing 102 and prevent the rail 110 and subsequently the slidable portion 104 from leaving the housing 102 altogether. That is, when a user extends the slidable portion 104, the slidable portion 104 is prevented from being completely removed from the housing 102 at the distal end 116.

The hook assembly may include a base 122 defining a recess 124. The recess 124 may be configured to receive and store the housing 102 and the hook 106 during non-use. As shown by way of example in FIG. 1, the recess 124 may include a first portion 128 for receiving the housing 102 and a second portion 130 for receiving the hook 106.

The housing 102 may include a pin 132 and the base 122 may define an indentation 134 within the recess 124 configured to receive the pin 132. Once arranged within the recess 124, the housing 102 may be pivotable within the recess 124 about the pin 132. As explained herein, the housing 102 may be folded into the recess 124 during non-use.

Figure 2A:
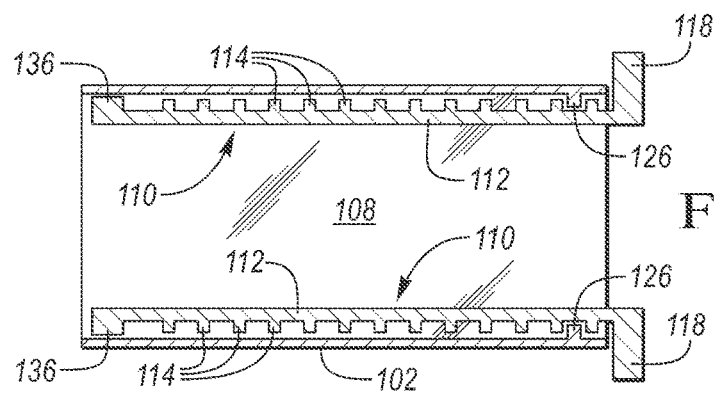
FIGS. 2A-D are cross-sectional views of a housing and a rail of the hook assembly of FIG. 1.

FIGS. 2A-D are cross-sectional views of the housing 102 and rail 110 of the hook assembly. FIG. 2A illustrates the housing 102 and a pair of rails 110 within the cavity 108 of the housing 102 in a retracted position. In the example of FIG. 2A, the rails 110 are in a relaxed state wherein the prongs 114 engage the projections 126, maintaining the rails 110 and the slidable portion 104 (not shown in FIG. 2A) within the housing 102.

Figure 2B:
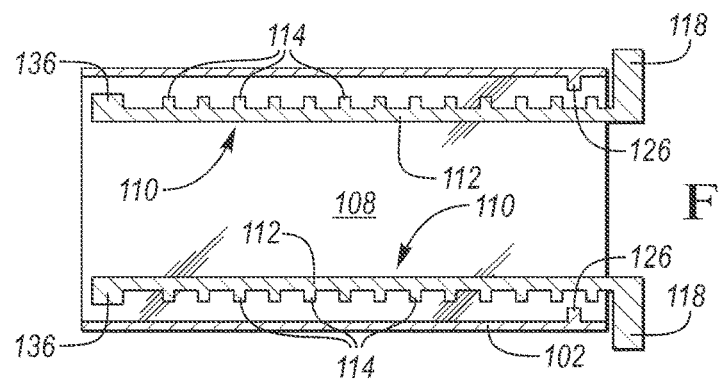

FIG. 2B illustrates the housing 102 and a pair of rails 110 in a retracted position. In this example, the rails 110 are in a depressed state. The knobs 118 have been depressed, causing the rails 110 to move inward and disengage the projection 126. In the depressed state, the rails 110 and the slidable portion 104 (not shown in FIG. 2B) may be slidable within the housing 102.

Figure 2C:
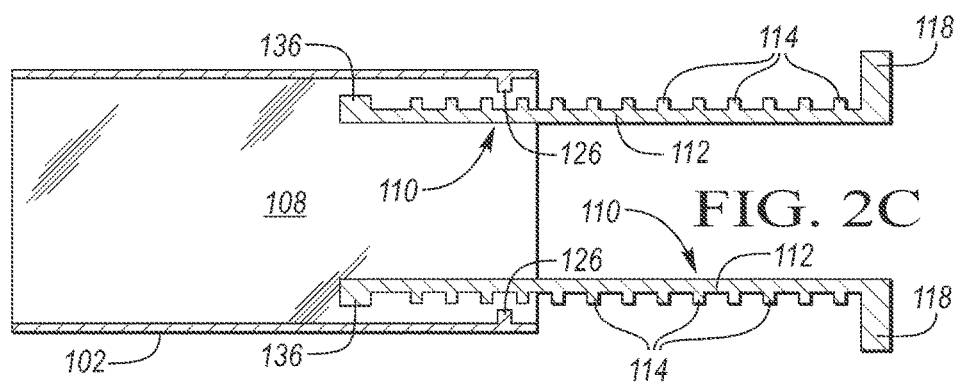
Figure 2D:
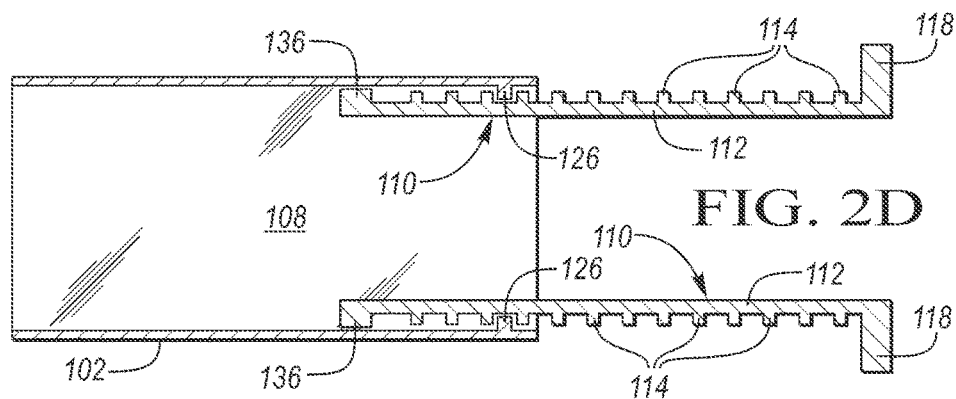

FIG. 2C illustrates the rails 110 in the depressed state where the rails 110 have been laterally moved within the housing 102 from the retracted position to a partially elongated position. As explained, in the depressed state, the user may adjust the length of the slidable portion 104 to a desired length. Once a desired length has been achieved, the user may release the knobs 118, and the rails 110 may return to a relaxed state, as shown in FIG. 2D. FIG. 2D illustrates the rails 110 in the relaxed state where the prongs 114 engage the projections 126 to maintain a fixed lateral position of the rails 110 with respect to the housing 102.

Figure 3A:
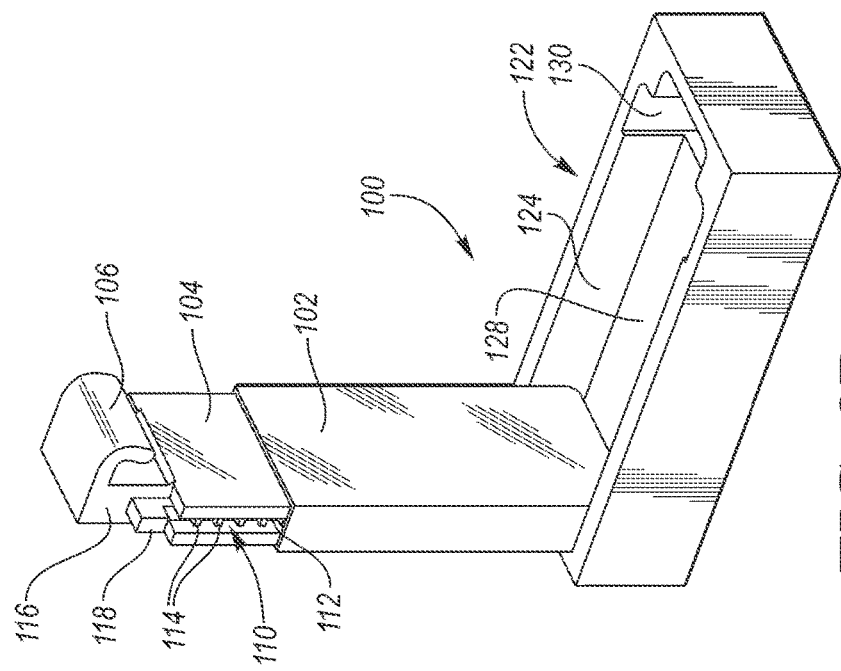
FIGS. 3A-E are perspective views of the hook assembly of FIG. 1.

FIGS. 3A-3E illustrate the various positions of the hook assembly 100 with respect to various lateral positions (i.e., the length of the hook assembly) and pivotable positions (i.e., the position of the housing 102 with respect to the base 122). FIG. 3A is a perspective view of a hook assembly 100 in an elongated and extended position. That is, the slidable portion 104 is fully extended with respect to the housing 102 and the housing 102 is perpendicular with the base 122. In this position, the hook 106 may be accessible and usable by the user.

Figure 3B:
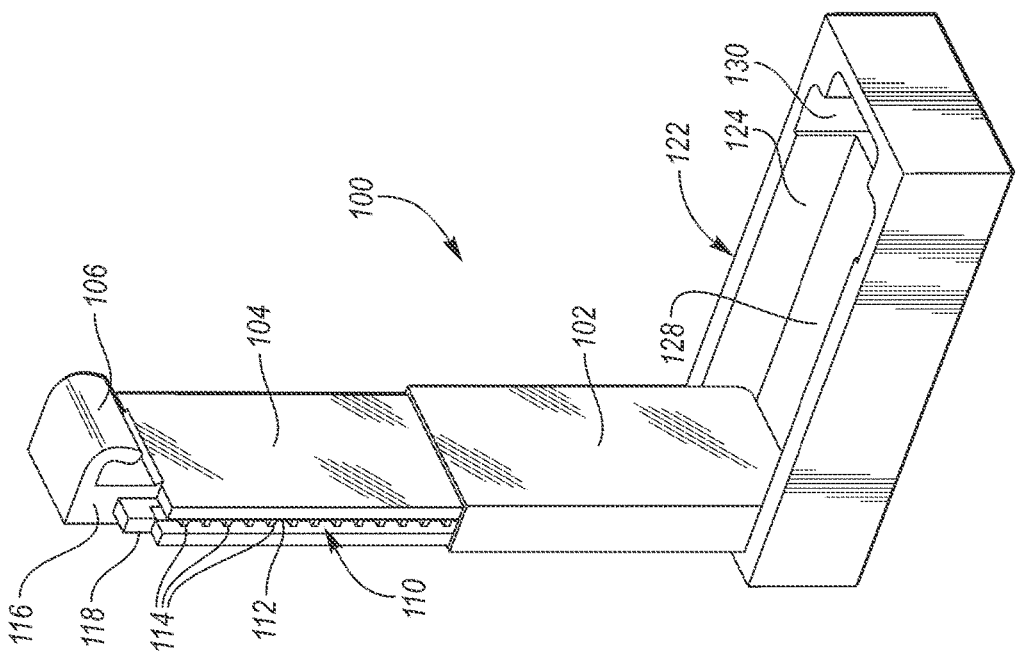

If a shorter length for the slidable portion 104 is desired, at least one of the knobs may be depressed and the slidable portion 104 may be slid, or moved, within the housing 102 to the desired length. FIG. 3B is a perspective view of the hook assembly in a partially elongated and extended position. Similar to FIG. 1A, the housing 102 is extended and perpendicular with the base 122. However, the slidable portion 104 is partially elongated, or at a length between the retracted and fully extended positions.

Figure 3E:
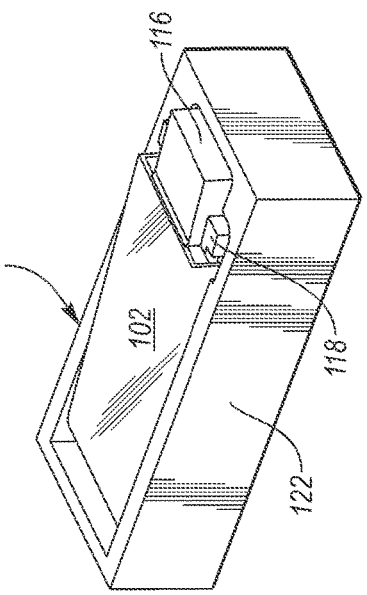
Figure 3D:
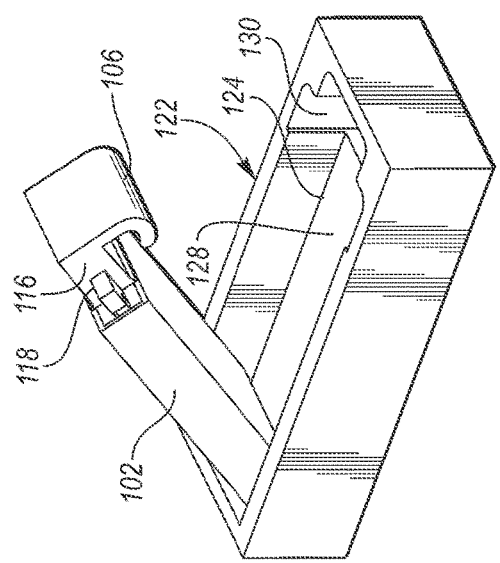
Figure 3C:
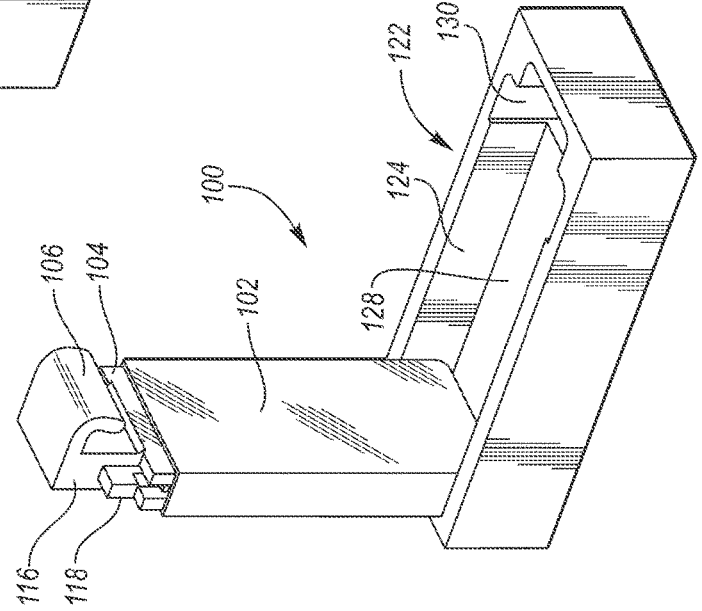

FIG. 3C is a perspective view of the hook assembly 100 in a retracted and extended position. In this example, the slidable portion 104 is retracted within the housing 102 such that the hook 106, the knob 118, and a portion of the slidable portion 104 extend out of the housing 102 at the distal end 116. In each of the lateral positions shown in FIGS. 3A, 3B and 3C, the hook may be accessible and usable by the user at least because the housing 102 is extended out of the recess 124 of the base 122. The slidable portion 104 may be fixed at a plurality of various lengths with respect to the housing 102. The amount of possible lengths may depend on the amount of prongs 114 extending from the spine 112 of the rail 110. Although the figures show a certain number of prongs 114, more or less may be included.

FIG. 3D is a perspective view of the hook assembly in a retracted and partially extended position. In this example, the housing 102 is pivoted with respect to the base 122 into a partially extended position. As the housing 102 continues to pivot, the housing 102 may eventually be received by the recess 124 of the base 122, as shown in FIG. 3E. FIG. 3E is a perspective view of the hook assembly in a retracted and stored position. In this example, the housing 102 and the hook 106 are arranged within the cavity 108 of the base 122 and may be stored therein during non-use of the hook assembly 100.

Figure 4:
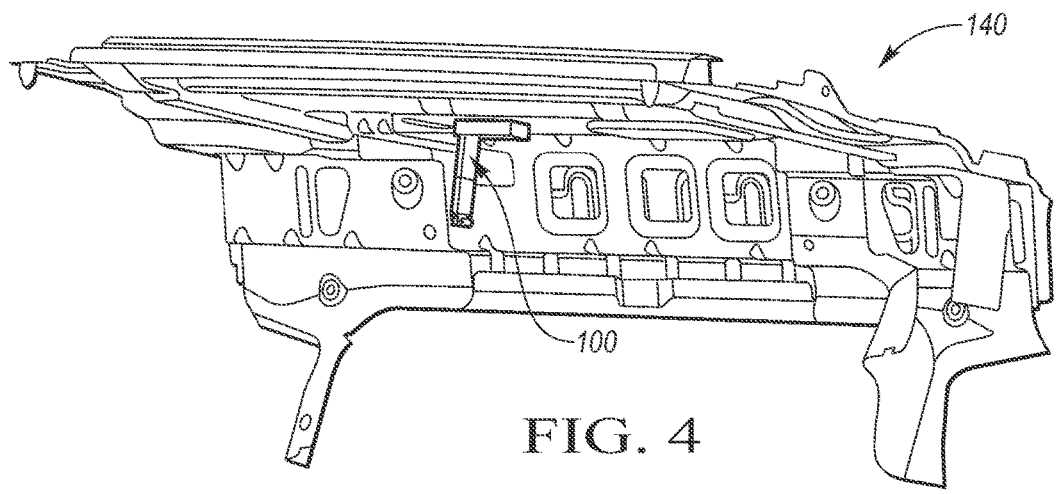
FIG. 4 is a perspective view of the hook assembly on a vehicle trunk plate.

FIG. 4 is a perspective view of the hook assembly 100 arranged on a vehicle trunk plate 140 in an elongated and extended position. The trunk plate 140 may be a portion or piece of sheet metal typically used to construct the trunk of a vehicle. Although not show, the trunk plate 140 may include a portion of the trunk door. The hook assembly 100 may be arranged on the trunk plate 140 during vehicle manufacturing and may be installed via welding, or other attachment mechanisms such as weld nuts, screws, extruded plates, etc. More than one hook assembly 100 may be arranged throughout the plate 140. By installing the hook assembly 100 during manufacturing, the need for after-market hook additions is eliminated. Furthermore, the hook assembly 100 may be arranged at available places along the plate 140.

Figure 5:
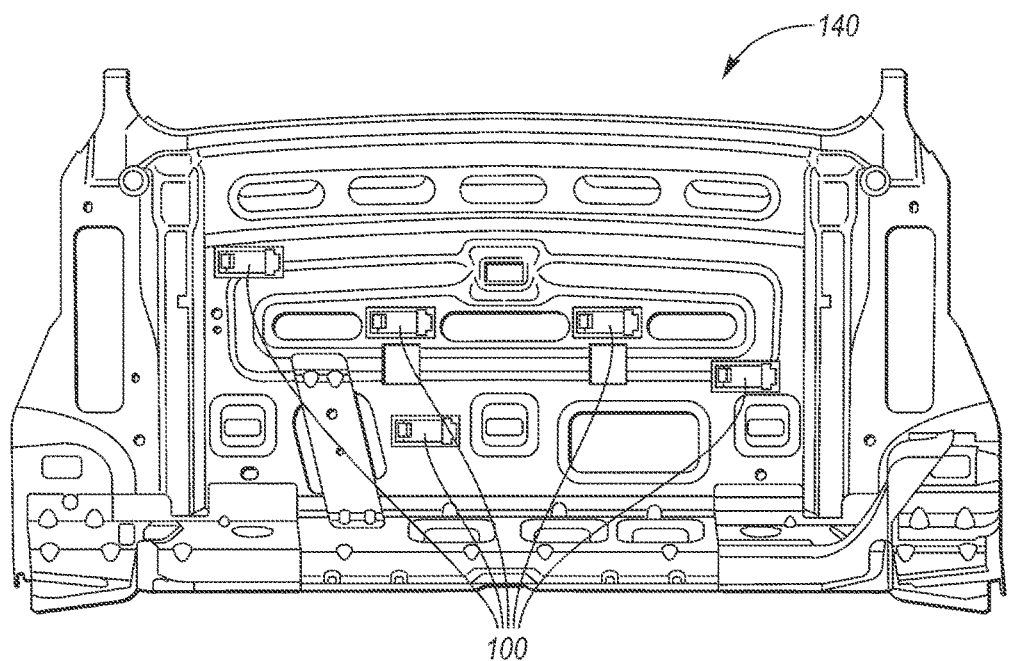
FIG. 5 is a bottom view the vehicle trunk plate.

FIG. 5 illustrates a bottom view of the hook assembly 100 arranged on the vehicle trunk plate 140. As shown in FIG. 5, a plurality of hook assemblies 100 are arranged on the plate 140.

Figure 6:
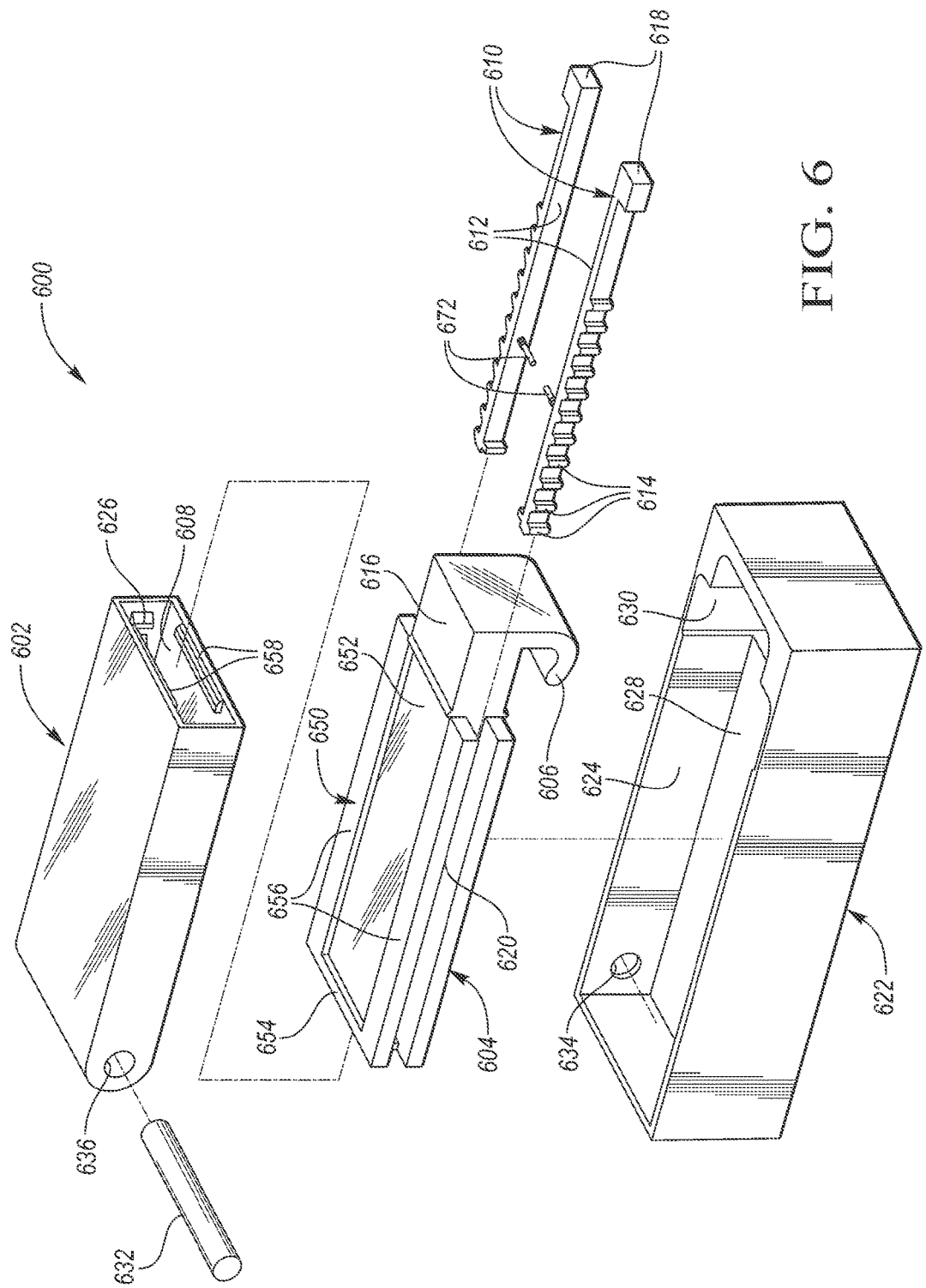
FIG. 6 is an exploded perspective view of another example hook assembly.

FIG. 6 illustrates another example hook assembly 600. The hook assembly 600 may be similar to the hook assembly 100 described above and may include a housing 602 having an internal cavity 608 and a plurality of projections 626 within the cavity along one or both of the sides thereof. The housing 602 may receive a slidable portion 604 within the cavity 608. A hook 606 may be arranged at a distal end 616 of the slidable portion 604 and may be configured to hold various items within the vehicle, as described herein. The slidable portion 604 may be slidable within the housing 602 between the first position, or the retracted position, and the second position, or the fully elongated position, similar to the examples discussed above.

The slidable portion 604 may define a groove 620 along the side or sides thereof. The groove 620 may be configured to receive a rail 610. The rail 610 may be configured to move inward and outward within the groove 120. In the example shown in FIG. 6, the rail may be connected to the slidable portion 604 via a pin assembly 672 as described in greater detail below with respect to FIGS. 7 and 8. The rail 610 may include a spine 612 and a plurality of rail prongs 614 extending along and outwardly from the spine 612. The rail 610 may include a knob 618, similar to knob 118 of FIG. 1. Upon depressing the knob 618, or pulling the knob 618 inward towards the slidable portion 604, the spine 612, and subsequently the prongs 614, may also move inward toward the slidable portion 604. Upon releasing the knob 618, the spine 612 may relax to a normal resting state away from the slidable portion 604.

The prongs 614 may be configured to engage with the projections 626 of the housing 602 in a relaxed state. When the prongs 614 mate with the projections 626, the slidable portion 604 may be laterally fixed within the housing 602. Upon depressing the knob 618, the prongs may release the projections 626, allowing for lateral movement of the slidable portion 604 within the housing 602.

The slidable portion 604 may include a ridge 650 on one or both faces of the slidable portion 604. The ridge 650 may be configured to create a cut-out 652 on the face of the slidable portion 604. As shown in FIG. 6, the ridge 650 may include a bottom ridge 654 and side ridges 656. The housing 602 may include a raised edge 658 arranged on the interior distal end thereof. The raised edge 658 may be configured to engage with the cut-out 652 defined by the ridge 650 of the slidable portion 604 to act as both a guide for the translation of the slidable portion 604 within the housing 602, as well as to act as a stop in order to prevent the slidable portion 604 from exiting the housing 602. When the slidable portion 604 is fully elongated with respect to the housing 602, the raised edge 658 may abut the bottom ridge 654, thus preventing the slidable portion 604 from leaving the housing 602 at the distal end 616.

The hook assembly 600 may include a base 622 defining a recess 624, similar to base 122 and recess 124 of FIG. 1. The recess 624 may include a first portion 628 for receiving the housing 602 and a second portion 630 for receiving the hook 606. The housing 602 may define a pin hole 636 configured to receive a pin 632. The base 622 may define an indentation 634 within the recess 624 configured to receive the pin 632 extending from the pin hole 636.

Figure 7:
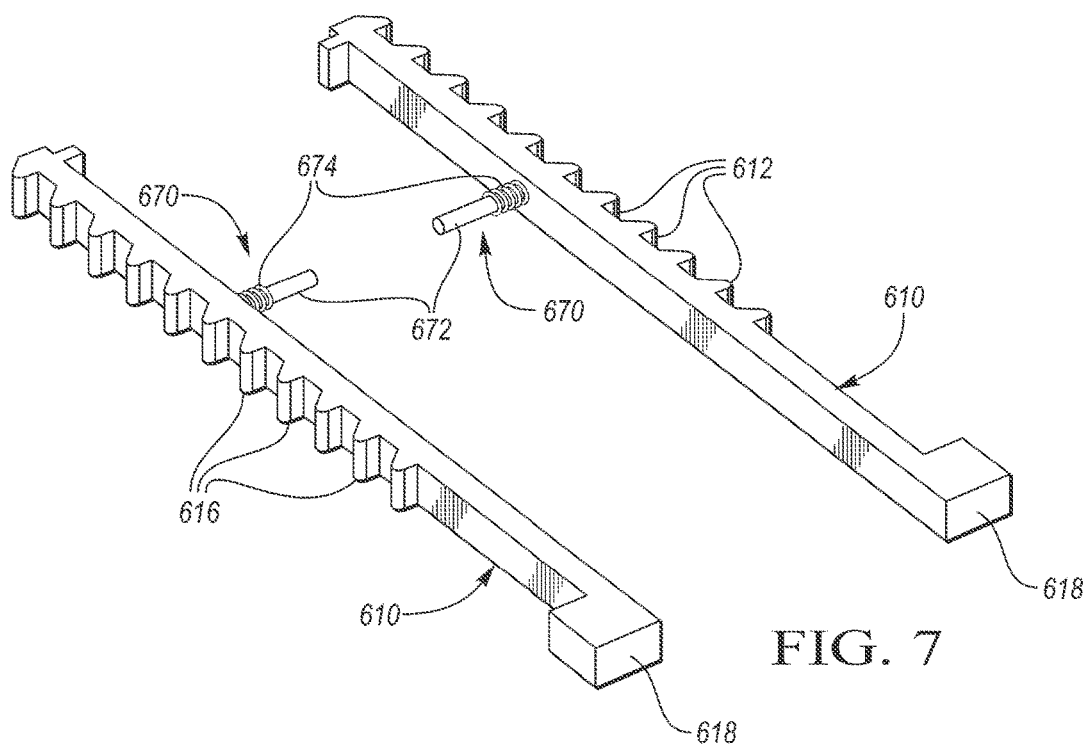
FIG. 7 is a perspective view of the rails of FIG. 6.

FIG. 7 is a perspective view of the rails 610 of FIG. 6. One or both of the rails 610 may include a pin assembly 670 having a rail pin 672 and a spring 674 surrounding at least a portion of the rail pin 672.

Figure 8:
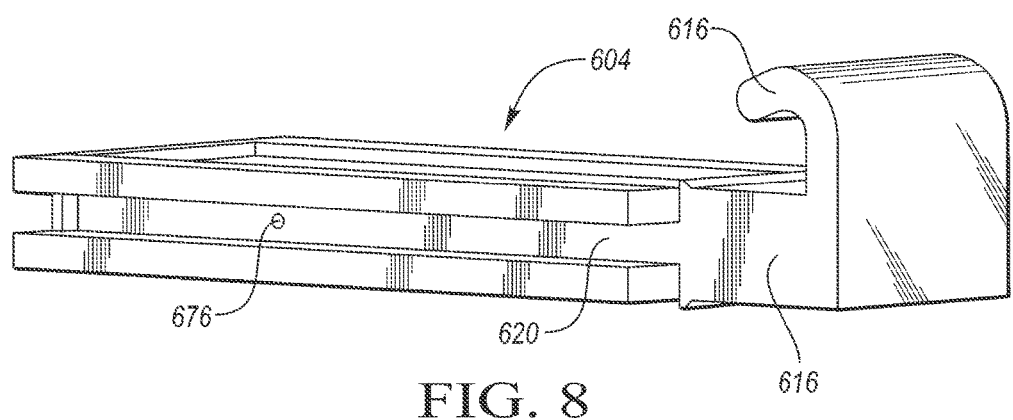
FIG. 8 is a perspective view of the slidable portion of FIG. 6.

FIG. 8 is a perspective view of the slidable portion 604 whereby the groove 620 of the slidable portion 604 defines a groove hole 676. The groove hole 676 may be arranged at or near a mid-point of the grove 620 and may be configured to receive at least a portion of the respective rail pin 672 on the rail 610. The rail pin 672, once inserted into the groove hole 676, may maintain the rail 610 within the groove 620. The spring 674, as shown in FIG. 7, may create an outward bias between the groove 620 and the rail 610 whereby the spring 674 may force the rail 610 to be biased away from the groove 620 in order to cause the prongs 614 of the rail 610 to engage with the projections 626 of the housing 602. The spring 674 may allow the rails 610 to be pinched inward into the groove 620 to release the engagement of the prongs 614 with the projections 626, thus allowing the slidable portion 604 to be slidable within the housing 604.

Figure 9A:
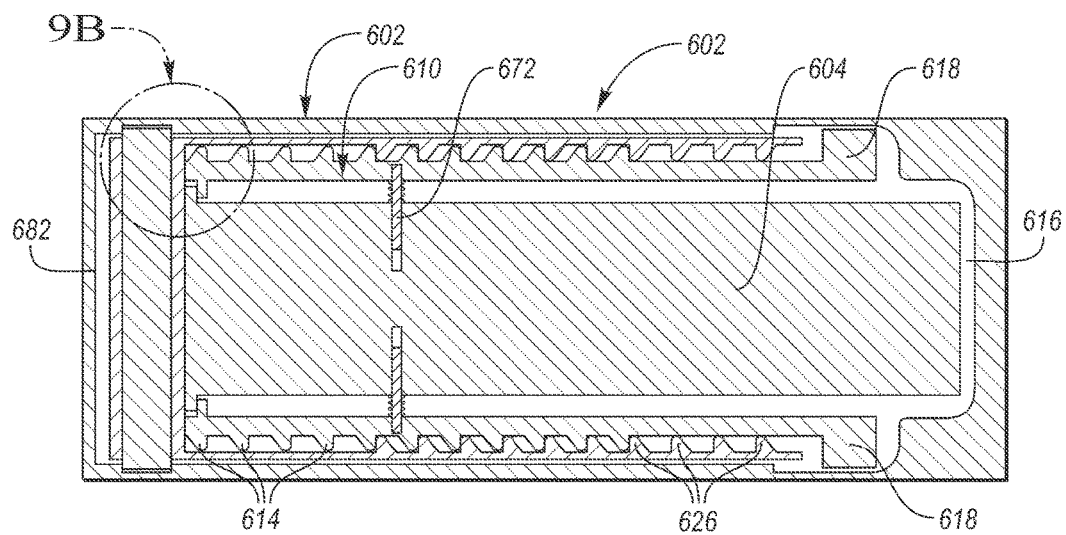
FIGS. 9A and B is a cross-sectional view of the hook assembly of FIG. 6.
Figure 9B:
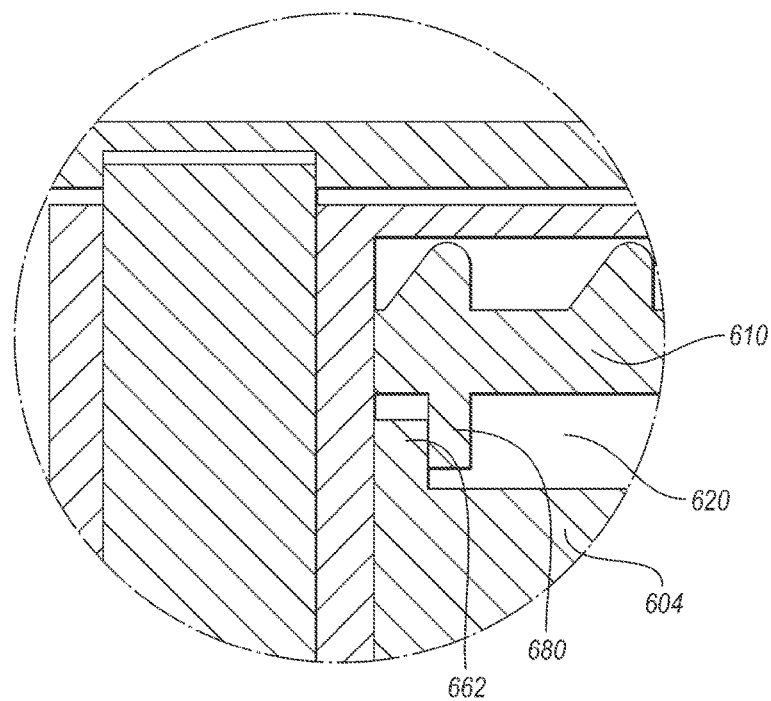

FIGS. 9A and 9B illustrate a cross-sectional view of the hook assembly 600 of FIG. 6. The slidable portion 604 may include a ledge 662 at the proximal end 682 of the slidable portion 604. The rail 610 may include a lip 680 at a proximal end opposite of the knob 618 and may be configured to abut the ledge 662. During lateral movement of the slidable portion 604 within the housing 602, the ledge 662 may be configured to move the rail 610 with the slidable portion 604 via the lip 680. That is, as the slidable portion 604 is pulled out of the housing 602, the ledge 662 will cause the rail 610 to move in the same lateral direction. Thus, in addition or alternative to the pin assembly 672, the lip 680 and ledge 662 may aid in maintaining the rail 610 within the groove 620 and may permit the rails 610 to move with the slidable portion 604 within the housing 602. The lip 672 and ledge 662 may allow the hook 606 on the slidable portion 604 to carry the weight of an item such as a bag without dislodging the rail 610 from the groove 620.

The hook assembly 600 of FIG. 6 may be arranged within the vehicle as indicated with respect to the hook assembly 100 in FIGS. 4 and 5 and may enjoy many of the features as described herein with respect to the hook assembly 100. The housing 102, 602, slidable portions 104, 604, bases 122, 622 and rails 110, 610 may be made of polypropylene and the pin 674 may be made of metal. Furthermore, the rail prongs 114, 614 may include a square-like shape, as shown by way of example in FIGS. 1 and 2. The rail prongs 114, 614 may also include a tapered shape, as shown by way of example in FIGS. 6-9.

Accordingly an adjustable and storable hook assembly for a vehicle is disclosed herein. The hook assembly may be stored during non-use. When a user wishes to hang a bag or other item from the hook assembly, a hook may be pulled down from its stored position and the length of the hook may be adjusted based on a user's desire. The hook may be pivotable and extendable so to allow a user to store the hook assembly when not in use. While the examples described herein include arranging the hook assembly within the vehicle trunk, the hook assembly may be arranged throughout the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A vehicle hook assembly, comprising:
   a housing having an internal cavity receiving a slidable portion having a hook at a distal end thereof;
   at least one depressible knob arranged on a side of the slidable portion configured to, in a depressed state, release the slidable portion from a fixed lateral position relative to the housing; and
   a base defining a cavity configured to store the housing and the hook when the slidable portion is in a retracted position within the housing, the housing being pivotable relative to the base.

2. The vehicle hook assembly of claim 1, a rail extending along a side of the slidable portion, wherein the rail includes a spine and a plurality of rail prongs extending outwardly from the spine.

3. The vehicle hook assembly of claim 2, further comprising at least one projection arranged on an interior of the housing and configured to engage with at least one of the rail prongs when the knob is in a relaxed state to maintain the slidable portion at a fixed lateral position relative to the housing and wherein the at least one projection is further configured to disengage with at least one of the rail prongs when the knob is in the depressed state to allow lateral movement of the slidable portion relative to the housing.

4. The vehicle hook assembly of claim 2, wherein the slidable portion defines a groove along a side thereof for receiving the rail.

5. The vehicle hook assembly of claim 2, wherein the rail includes at least one stop at an end opposite the knob to maintain at least a portion of the hook within the housing during extension thereof.

6. A hook assembly, comprising:
   a housing having an internal cavity and a at least one projection therein, the housing receiving a slidable portion having a hook at a distal end thereof; and
   a rail extending along a side of the slidable portion and including at least one depressible knob and a plurality of prongs along a spine, the prongs configured to engage with the projection to maintain the slidable portion at a fixed lateral position relative to the housing when the knob is in a relaxed state, the prongs further configured to disengage with the projection to allow lateral movement of the slidable portion when the knob is in a depressed state.

7. The hook assembly of claim 6, further comprising a base defining a cavity configured to receive the housing, wherein the housing is pivotable relative to the base.

8. The hook assembly of claim 7, wherein the housing is moveable between an extended position perpendicular to the base and a stored position within the cavity.

9. The hook assembly of claim 6, wherein the housing and the hook extending from the distal end of the slidable portion are configured to be storable within the cavity when the slidable portion is in a retracted position within the housing.

10. The hook assembly of claim 6, wherein the slidable portion defines a groove along the side thereof for receiving the rail.

11. The hook assembly of claim 10, wherein the rail is axially pliable within the groove such that upon depression of the knob, the rail is configured to move inward toward the slidable portion and disengage with at least one of the prongs, and upon release of the knob, the rail is configured to engage at least one of the prongs.

* * * * *